United States Patent [19]

Engel et al.

[11] Patent Number: 4,847,474

[45] Date of Patent: Jul. 11, 1989

[54] METHOD AND APPARATUS FOR READING A BAR CODE

[75] Inventors: Steven J. Engel, Chester County, Pa.; Kurt B. Augenblick; Lesley M. Freed, both of New Castle County, Del.; Charles T. Coffey, Cecil County, Md.; Paul C. Dryden, Chester County, Pa.

[73] Assignee: Hewlett-Packard Company, Palo Alto, Calif.

[21] Appl. No.: 142,974

[22] Filed: Jan. 12, 1988

[51] Int. Cl.4 .............................................. G06K 7/10
[52] U.S. Cl. .................................... 235/464; 235/375; 235/462
[58] Field of Search ................. 235/464, 375; 250/566

[56] References Cited

U.S. PATENT DOCUMENTS 4,622,457 11/1986 Bradley .............................. 235/464

Primary Examiner—Harold I. Pitts
Attorney, Agent, or Firm—Richard Schuette

[57] ABSTRACT

The bar code on the cylindrical surface of an object is accurately read by rotating the object past a bar code reader so that the bar code passes the reader a plurality of times. Each of the readings from the reader is compared with the other readings and a final reading is provided when several of the same readings is obtained in succession. The object may be rotated pass the reader first in one direction and then in the opposite direction to assure a proper reading in the event that the bar code is backwards. Also, the object may be rotated at a varying speed to obtain the optimum scan speed for the particular density of the bar code.

10 Claims, 1 Drawing Sheet

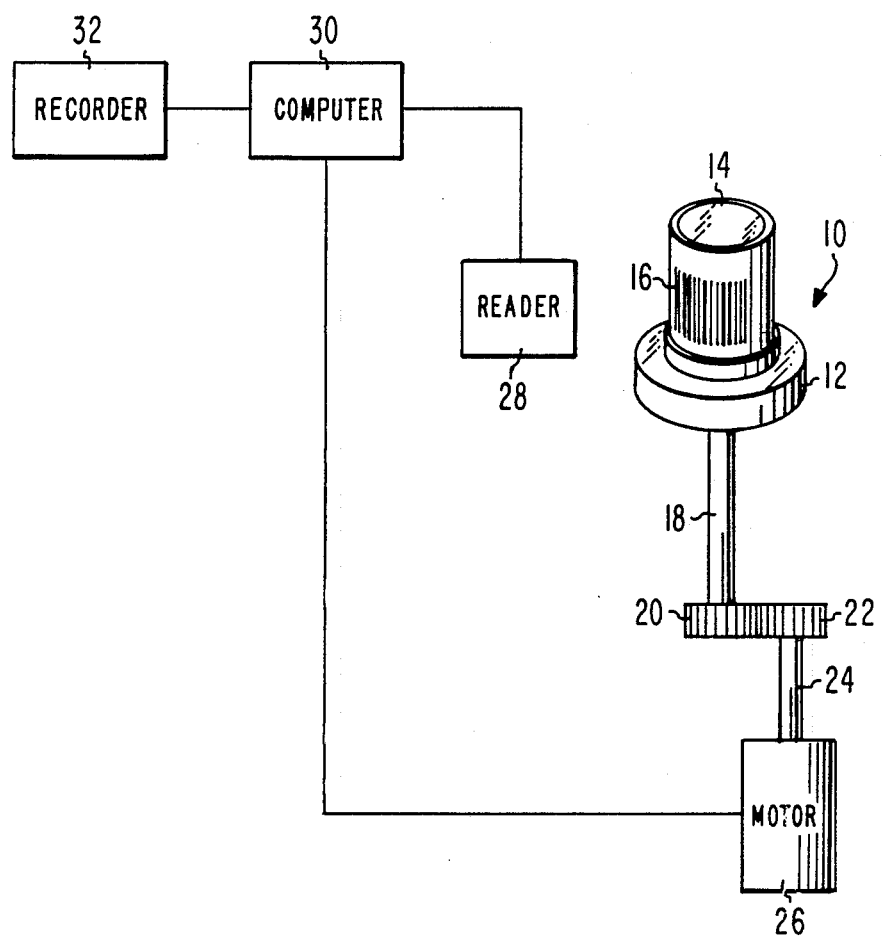

METHOD AND APPARATUS FOR READING A BAR CODE

FIELD OF THE INVENTION

The present invention relates to a method and apparatus for reading a bar code with high integrity. More particularly, the present invention relates to a method and apparatus for reading a bar code on small cylindrical objects.

BACKGROUND OF THE INVENTION

Recently there has been increasing use of bar codes on objects to automatically identify the object or the contents of the object. The bar code is generally printed on the object or on a label attached to the object. The bar code is generally read by either passing the object across a reader, or by a hand held reader which is passed across the bar code on the object. Bar codes which are arranged circumferentially around a cylindrical surface limit the length of the code. This problem is especially severe with small diameter cylindrical objects, such as sample vials used in an analytical laboratory. For data integrity, it is traditional to use a check character (checksum) on the bar code to minimize the chance of error. This practice further limits the space for data by utilizing a character space. Therefore, it would be desirable to have a method for reading the bar code on an object, particularly a small cylindrical object, which will provide an accurate reading of the bar code without decreasing the space on the object for the bar code.

SUMMARY OF THE INVENTION

A bar code on an object is read by scanning the object so that the bar code is scanned by the bar code reader a plurality of times. The readings from each of the times are compared until several of the same readings are obtained. This reading is given as the final reading of the bar code. In the preferred embodiment of the invention, the object with the bar code comprises a cylindrical surface which is rotated during scanning.

BRIEF DESCRIPTION OF DRAWING

The FIGURE of the drawing is a schematic view of one form of an apparatus which can be used to carry out the method of the present invention.

DETAILED DESCRIPTION OF PREFERRED EMBODIMENTS

In accordance with the method of the present invention, an object having a cylindrical surface with a bar code on the surface is placed in front of a bar code reader and rotated so that the bar code passes the reader a plurality of times. The bar code reader reads the bar code each time it passes. The various readings are then compared and when the same reading is obtained over several successive passes, the reading is reported as the reading of the bar code. By reading the bar code until several of the same readings are obtained successively, the probability of a mis-reading is minimized. The greater the number of times that the bar code is rotated past the reader the greater the integrity of the final reading. However, the object should be rotated past the reader at least three times with the maximum number of times depending on the speed of rotation of the object, the speed that the reader can read the bar code, and the amount of time available in the overall operation in which the reader is being used. Generally, the speed that the reader can read the bar code will limit the speed of rotation of the object. If the objects are being read on an individual basis, there may be no particular time limit on the amount of rotations which can be carried out. However, if the reading is being made on objects flowing along an assembly process of some type, the number of rotations may be limited by the speed of the overall process. However, it has been found that sufficient number of rotations to obtain from two to fifteen successive identical readings has been satisfactory.

Referring to the FIGURE of the drawing, one form of an apparatus which can be used to carry out the method of the present invention is generally designated as 10. The reading apparatus 10 includes a turntable 12 on which the object 14, such as a cylindrical vial, is seated. The vial 14 has a bar code 16 around its cylindrical surface. The turntable 12 has a shaft 18 extending therefrom with a gear 20 on the end of the shaft 18. The gear 20 meshes with a drive gear 22 on the end of the output shaft 24 of an electric motor 26.

A standard bar code reader 28 is positioned adjacent the cylindrical surface of the vial 14 so as to be able to read the bar code 16 on the vial 14. The bar code reader 28 is connected to a computer 30 which will receive each of the readings of the reader 28 and will compare the readings until an identical reading is obtained several times. The computer 30 is connected to a display 32 which will display the final output of the computer 30 when several of the same reading is obtained. The display 32 may be a printer, digital meter or other visual display. The computer 30 may also be connected to the motor 20 to permit the computer to control the operation of the motor 20. For example, the computer may stop the motor 20 to stop the rotation of the vial 14 when several of the same readings are obtained.

When the apparatus 10 is being used as part of a continuous process, it may be provided with means for automatically feeding the objects 14 to the turntable 12 and removing them from the turntable 12. For example, a conveyor or chute may lead up to the turntable 12 to feed the objects to the turn table, and a second conveyor or chute may lead away from the turn table 12 to carry the objects 14 away from the turn table 12 after the bar code 16 had been read.

In the use of the method and apparatus of the present invention, it is possible that an object may be placed in front of the bar code reader with the bar code being backward. This may be the result of either the object being positioned up side down, of the label containing the bar code being placed on the object backwards, or the bar code having been printed on the object backwards. To overcome this possibility, the method of the present invention can be carried out by first rotating the object past the bar code reader in one direction for several revolutions, and then rotating the object past the bar code reader in the opposite direction for several revolutions. Thus, if the quiet zone is not adequate to provide a good reading in one direction it should be satisfactory when the object is rotated in the opposite direction. When read in the proper direction a good reading will be obtained and will be provided by the computer when several of such good readings are achieved in succession. In the apparatus 10, the reversal of the motor 20 to rotate the vial 14 in both directions can be controlled by the computer 30.

Another problem which may arise in the reading of bar codes results from the fact that a bar code reader will read bar codes printed at different densities at different optimum scan rates. Thus, if the bar code is printed lightly the optimum scan rate for reading the bar code will be different than for a bar code printed darker. To overcome this problem with the method and apparatus of the present invention, the object is rotated at a varying spin rate over a plurality of rotations. Thus, during a part of the rotation, the bar code will pass the reader at the optimum scan rate to achieve a good reading. In the apparatus 10, the computer 30 can be used to automatically vary the speed of the motor 20 and thereby vary the scan rate of the bar code 16 by the reader 28. Also, in the apparatus 10 which spins the objects 14, if there are any resonance, they can be avoided by the scanning through various speed to minimize any wobble that may occur between the bar code surface and the reader.

Thus, there is provided by the present invention a method and apparatus for accurately reading bar codes on a cylindrical surface, particularly on small cylindrical objects. The object is rotated so that the bar code passes the reader a plurality of times and the readings from each rotation is compared to the others until the same reading is obtained several times. This reading is provided as the final reading. The object may be rotated in opposite directions to provide readings in the event that the bar code is on the object backwards. Also, the object may be rotated with varying speeds to ensure obtaining the optimum speed for the particular density of the bar code being read.

What is claimed is:

1. A method of reading a bar code on an object having a cylindrical surface with a bar code reader comprising the steps of:
   rotating the object so that the bar code passes the reader a plurality of times; and
   comparing the readings from each pass of the bar code until several of the same readings are obtained.

2. A method in accordance with claim 1 where the readings are compared until several of the same readings are obtained in succession.

3. A method in accordance with claim 2 in which the object is rotated so that the bar code passes the reader until from two to fifteen of the same readings are obtained in succession.

4. A method in accordance with claim 2 in which the object is first rotated several times past the reader in one direction and then several times in the opposite direction.

5. A method in accordance with claim 2 in which the speed of rotation of the object is varied to provide various scan speeds of the bar code across the reader.

6. An apparatus for reading the bar code on an object having a cylindrical surface comprising:
   a bar card reader;
   means for supporting the object adjacent the reader and for rotating the object so that the bar code passes the bar code reader several times; and
   means connected to the reader to receive the readings of the bar code from the reader and for comparing the bar code readings and providing a single reading when the same reading is received several times.

7. Apparatus in accordance with claim 6 in which the means connected to the reader to receive the readings of the bar code provides a single reading when the reading is received several times in succession.

8. Apparatus in accordance with claim 7 including means for rotating the object first in one direction and then in the opposite direction.

9. Apparatus in accordance with claim 7 including means for rotating the object at a varying speed so as to vary the scan speed of the bar code pass the reader.

10. Apparatus in accordance with claim 7 in which the means receiving the readings from the reader and for comparing the readings is a computer.

* * * * *